Patented Dec. 28, 1943

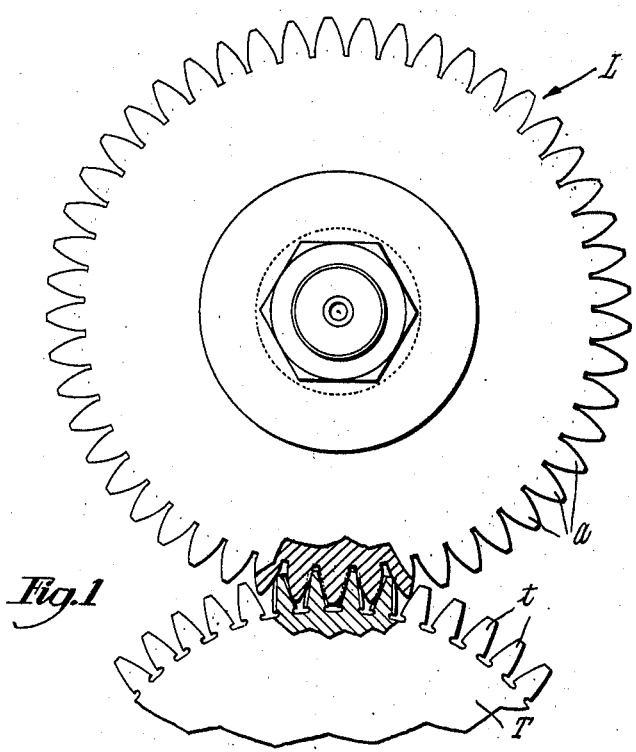
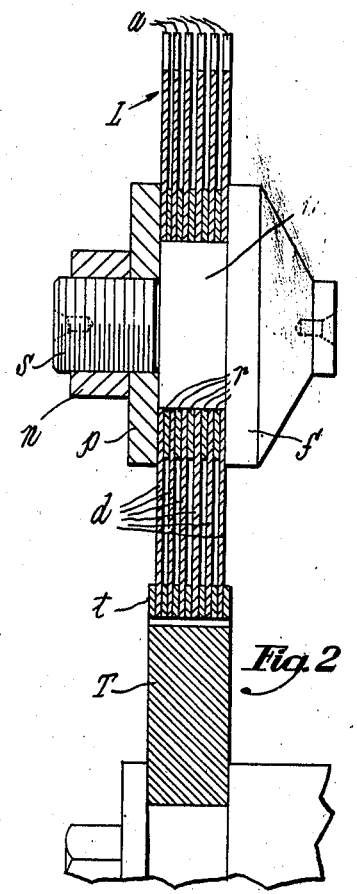
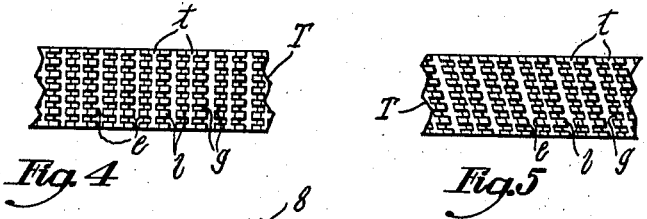
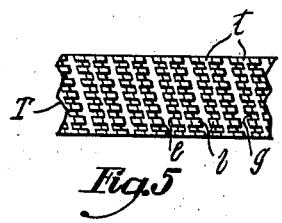
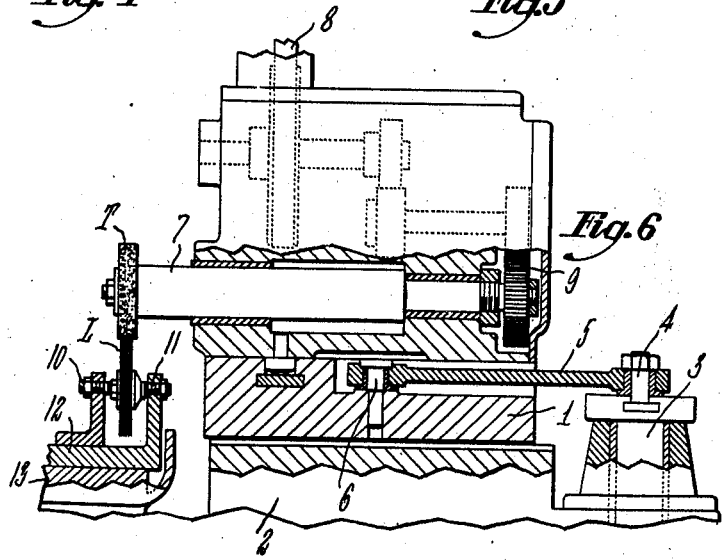
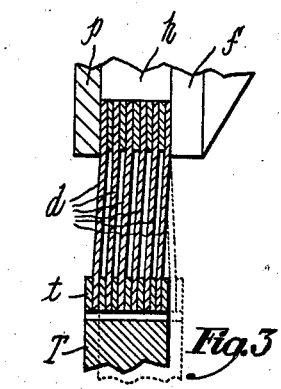

2,338,061

UNITED STATES PATENT OFFICE 2,338,061

METHOD AND MEANS FOR FINISHING THE TOOTH GROOVES OF GEAR SHAVING TOOLS

Walter F. Ross, Springfield, Vt., assignor to The Fellows Gear Shaper Company, Springfield, Vt., a corporation of Vermont Application February 4, 1941, Serial No. 377,278

9 Claims. (Cl. 51—288)

The object and result of the present invention is to finish the faces or bounding walls of the grooves which are cut in the tooth faces of gear shaving tools to produce cutting edges intermediate the ends of such teeth.

Tools which are known in the art as gear shaving tools are employed to finish gears by cutting away irregularities on, and smoothing, the side faces of the gear teeth. These tools are made in the form of master gears conjugate to the gears which they are designed to finish and are fashioned from hard metal compositions, such as high speed steel, carbon tool steel, or other alloy steel. At least the parts of such tools in which the teeth conjugate to the gear teeth are formed, are made of such a composition.

In the manufacture of such tools, grooves are cut in the side faces of their teeth extending in the direction of the height of the teeth. These grooves are spaced apart from one another so that lands, which are segments of the original tooth faces, are left between them. The lands and side faces of the grooves meet at edges which are sharp enough to perform a scraping effect on the tooth faces of meshing gears, notwithstanding that the angle included between the intersecting surfaces may be 90° or more; and such edges are capable of removing metal from the surfaces of the gear teeth on which they act, when relative movement is produced between the intermeshing teeth lengthwise thereof, as when the tool and gear are run in mesh in planes which intersect at an oblique angle, so that a slip or skid of the meshing teeth results. After the teeth have been cut to approximate form and dimensions and the slots have been cut in their faces as described, they are hardened by appropriate heat treatment and their side faces, i. e., the lands above described, are ground with the exact curvature and spacing from tooth to tooth required for the service which the tool is designed to perform.

Heretofore the sides of the grooves have received no attention after the heat treatment. The tools with ground face lands have been put out as finished products with the sides of the intersecting grooves in the same condition as when they were hardened and sand blasted. Many tools so made have been unsatisfactory in regard to their ability to finish gears accurately and with the desired smoothness of surface. I have made extensive studies seeking to discover the causes of such deficiencies, and have found that one cause is that the bounding surfaces of the grooves are frequently rough and irregular, and that these surfaces have a soft skin or decarbonized superficial layer of greater or less extent. These defects frequently prevent the cutting edges from having the continuity, sharpness and resistance to deterioration with use, necessary for producing the best results, which they would have if the surface referred to were finished to the clean hard metal.

Another factor which interferes with satisfactory performance of such tools after they have been reconditioned by grinding the tooth face lands to sharpen dull edges, is the burr or wire edge produced on such edges by the action of the grinding wheel.

It is the purpose of this invention to provide a means and procedure by which the sides of the grooves may be finished accurately after hardening, by removal of roughness, burrs or wire edges, and the friable surface or skin, in the initial production of the tool, and by which the burr produced by grinding in reconditioning the tool may be removed also.

The invention herein described is one embodiment of means which I have devised for this purpose, and consists in a lapping means and procedure according to which a lapping instrument is caused to enter the grooves of different teeth progressively and successively, and is brought to bear alternately on the opposite sides of the groove with a yielding pressure. Another invention which I have devised for a like purpose is disclosed in a companion application for patent filed by me.

The principles of the invention are hereinafter set forth in connection with the illustration of one form of means adapted to be used in performing the method phase of the invention.

In the drawing—

Fig. 1 is an elevation, partly broken away and shown in section, of a shaving tool and a lapping instrument operatively engaged with one another in the manner of the invention;

Fig. 2 is a sectional view of such shaving tool and lapping instrument taken on a plane containing the axes of both;

Fig. 3 is a view similar to Fig. 2 showing different stages in the lapping procedure;

Figs. 4 and 5 are fragmentary plan views of different illustrative shaving tools;

Fig. 6 is a diagrammatic view, partly in section and partly in elevation, of illustrative mechanism by which movements may be imparted to the lapping instrument and shaving tool being lapped, for carrying out the lapping procedure.

Like reference characters designate the same parts wherever they occur in all the figures.

The shaving tool is designated by the reference letter T. It is provided with teeth $t$ which are as accurate in form and spacing as possible and of which the face curves are conjugate to the teeth of the gears which the particular tool is designed to finish. Grooves $g$ are cut in the side faces of the teeth $t$ and are separated from one another lengthwise of the teeth by lands $l$, the bounding edges $e$ of which are the cutting edges of the tool. The teeth $t$ may extend either parallel to the axis of the shaving tool, corresponding thus to the teeth of a spur gear, as represented in Fig. 4; or they may be helical and correspond to the teeth of a helical gear, as shown in Fig. 5. The grooves may lie in planes perpendicular to the axis of the tool or normal to the helix angle of the teeth, in the case of the helical form of tool, or in planes of intermediate angle.

The lapping instrument is a collection of disks $d$ mounted coaxially and spaced apart from one another. In the illustration here given the disks $d$, and intermediate spacing rings or washers $r$, are placed in series on a cylindrical holder H having an integral flange $f$ at one end and a threaded stem $s$ at the other, and are crowded together and against the flange $f$ by a nut $n$ screwed on the stem $s$ and acting through a press plate $p$.

The disks $d$ are of a material sufficiently stiff to maintain their shape and positions on the holder, and sufficiently flexible and resilient to withstand rapidly repeated transverse flexure of short extent, over a long period of time without either breaking or acquiring a permanent set. Copper and brass are suitable materials for this purpose; although of course there are many other materials which have the requisite qualities, any of which may be employed.

The disks $d$ have a thickness, at least at their margins, wherein teeth $a$ are cut, enough less than the widths of the grooves $g$ to permit entrance of such teeth $a$ into said grooves; and the spacing rings $r$ have proper thickness to establish a spacing between the central planes of the disks $d$ approximately equal to the spacing between the mid planes of the grooves $g$. In circular spacing around the axis of the lapping instrument, and in outline, the teeth $a$ are conjugate, or approximately so, to the bottom surfaces of the grooves $g$; and their width is such as to permit penetration between the teeth $t$ substantially to the root circumference of the latter. Thus the lapping instrument is capable of being brought into gear mesh with the shaving tool in a manner such that the teeth of its component disks protrude into the face grooves of flanking teeth of the shaving tool and bear on the bottoms of such grooves.

In the performance of the lapping method, the lapping instrument is brought into such meshing engagement with the shaving tool with its axis parallel to that of the shaving tool; and there rotated. Either may be driven by torque delivered from an external source and may transmit rotation to the other through their intermeshing gear action. In the course of their rotation successive teeth of the lapping instrument enter between successively approaching teeth of the shaving tool and withdraw after passing the pitch point. At the same time, either the shaving tool or the lapping instrument is moved axially relatively to the other a distance sufficient to bring the end-plane surfaces of the teeth $a$ alternately against opposite sides of the grooves $g$ and cause them to bear with yielding pressure. Fig. 3 illustrates the nature of this translative movement, showing by solid lines the limit of relative axial displacement in one direction, and by dotted lines the corresponding limit in the opposite direction. The movement need not be as great as that thus indicated. It may be only enough to take up the clearance between the disks and the sides of the grooves and apply a sufficient pressure to cause cutting action by the abrasive grains of the lapping compound provided and applied in accordance with the well known principles of lapping.

A suitable mechanism for thus imparting rotation to the shaving tool and lapping instrument is illustrated diagrammatically in Fig. 6. Here a carriage 1 is mounted to reciprocate on the machine base 2 and is thus reciprocated by a shaft 3 carrying a radially adjustable crank pin 4 which is coupled to the carriage 1 by a connecting rod 5 and wrist pin 6. A spindle 7, adapted to support the shaving tools T to be lapped, is mounted rotatably in the carriage with its axis parallel to the path of movement thereof and is driven by a motor supported on the carriage, but not here shown, acting through a belt 8, transmission gearing shown by dotted lines, and a gear 9 on the spindle 7. The lapping instrument, which is designated as a whole by the reference letter L, is rotatable on centers 10 and 11 in a holder 12 on a table 13. The latter is mounted on the machine base with provision for adjustment and continuous reciprocation toward and away from the axis of spindle 7. The means for rotating shaft 3, and for adjusting and reciprocating the table 13 in the manner described, are not shown here, but may be the same as are illustrated in the patent of Edward W. Miller No. 2,280,045 granted April 14, 1942.

By the procedure thus described it is possible to remove all roughness and hardening scale and produce clean finished surfaces with sharp bounding edges on all the teeth of the shaving tool in a few minutes. The sliding motion as the teeth of the lapping instrument pass into and out of mesh with the teeth of the shaving tool is generally sufficient to clean the entire extent of the tooth groove faces; but if additional rubbing action is required, this may be provided by rapid reciprocation of the table 13 of short extent toward and away from the axis of spindle 7.

The relative positions of the shaving tool and lapping instrument may be reversed on the spindle 7 and holder 12, respectively, by providing a cylindrical hub for the lapping instrument and by placing an arbor in the central hole of the shaving tool.

In lapping instruments designed for use with shaving tools of spur gear character, corresponding teeth of the several disks are alined parallel to the axis of the disks; while with those designed for finishing helical shaving tools, the disks are displaced angularly with respect to one another sufficient to place their teeth in a helical arrangement corresponding to the helix angle of the shaving tool teeth. For shaving tools in which the tooth grooves are located in planes inclined to the axis of the tool, the teeth of the lapping disks are twisted to equal inclinations with the planes of the respective disks.

What I claim and desire to secure by Letters Patent is:

1. In the production of gear finishing tools having teeth with a plurality of grooves and cutting edges in their opposite side faces, the method of smoothing said cutting edges and the side faces of said grooves which consists in placing in meshing relation with such a tool a disk having teeth formed to enter between the teeth of the finishing tool and to project into said grooves, causing the finishing tool and said disk to rotate in the manner of meshing gears, whereby the teeth of the disk enter and withdraw from the grooves of the finishing tool teeth progressively and in succession, and producing a relative axial movement between the disk and finishing tool so as to bring the teeth of the disk to bear alternately on opposite sides of the finishing tool grooves.

2. In the production of gear finishing tools having teeth with a plurality of grooves and cutting edges in their opposite side faces, the method of smoothing said cutting edges and the side faces of said grooves which consists in placing in intermeshing relation, with their axes parallel to each other, such a tool and a plurality of coaxial disks having teeth substantially conjugate to the bottoms of the grooves in the tool teeth and of a thickness enough less than the width of said grooves to permit entrance into the grooves, said disks being spaced apart as to their median planes in substantial equality to the spacing between the central planes of said grooves, with the disk teeth projecting into the grooves of the finishing tool teeth, rotating the disks and finishing tool about their respective axes, and producing a relative axial reciprocation between the disks and finishing tool sufficient to cause the teeth of the disks to bear alternately against the opposite sides of the grooves in the finishing tool.

3. In the production of gear finishing tools having teeth with a plurality of grooves and cutting edges in their opposite side faces, the method of smoothing said cutting edges and the side faces of said grooves which consists in placing in intermeshing parallel-axis relation, such a gear finishing tool and an assemblage of coaxial parallel disks spaced apart axially from one another by distances between corresponding planes substantially equal to the distance in the axial direction of the shaving tool between corresponding points in the tooth grooves of such tool, said disks being sufficiently thin at their peripheries to enter said grooves and having teeth in their margins substantially conjugate to the bottoms of the grooves and being sufficiently flexible to permit flexing by laterally applied pressure to a limited extent out of their planes without fracture or acquiring a permanent set, and sufficiently resilient to resist such flexure and return to said planes when such pressure is relaxed and the meshing teeth of the disks projecting into the tooth grooves of the shaving tool, rotating one of the units constituted by the assemblage and gear finishing tool about its axis and thereby driving the other unit rotatably, and producing a limited axial movement of one relatively to the other sufficient to bring the disk teeth into yielding contact with the opposite sides of the finishing tool grooves alternately.

4. In the production of gear finishing tools having teeth with a plurality of grooves and cutting edges in their opposite side faces, the method of smoothing said cutting edges and the side faces of said grooves consisting in placing such a gear finishing tool in mesh with an assemblage of metal plates alined coaxially and located in parallel planes with spacers between them, said plates being thinner than the width of the tooth grooves of the finishing tool and being spaced from one another by distances wider than the lands of the finishing tool teeth, being flexible and resilient to permit flexure from their plane condition and sufficiently stiff to resist such flexure forcibly, the peripheral portions of said plates extending beyond the spacers and having teeth approximately conjugate to the inner boundaries of the finishing tool tooth grooves; said method consisting further in placing said assemblage and finishing tool in mesh with their axes substantially parallel, running them in meshing relation, and moving one back and forth relatively to the other to bring the abrading teeth into bearing alternately with the opposite sides of the finishing tool grooves.

5. An apparatus for smoothing and finishing the grooves in the tooth faces of toothed gear shaving tools comprising a holder, and a collection of toothed disks and intermediate spacers secured in axial alinement on said holder, the disks extending beyond the circumferential boundaries of the spacers and having teeth in their margins, means for mounting said collection of disks and a shaving tool rotatably with their axes parallel and their teeth in mesh, means for imparting rotation to one of them, and means for effecting a relative axial movement back and forth between the mounting means for the shaving tool and the mounting means for said collection of disks.

6. An abrading instrument consisting of a holder, a series of metal disks having teeth of gear tooth character on their margins, mounted coaxially on said holder, and spacing rings of smaller diameter than said disks mounted on the holder between the adjacent disks holding the outer portions of said disks spaced apart from one another; the portions of the disks which extend beyond said spacing rings being of suitable thickness and having suitable resilience and flexibility to permit flexure and forcibly resist such flexure, and having sufficient stiffness to transmit rotation to or from a mating gear-like member by means of said teeth.

7. A lapping tool consisting of an assemblage of coaxial parallel disks spaced apart axially from one another and having teeth of gear tooth character at their margins, corresponding teeth of the several disks being alined in the general direction of the axis of said assemblage, said disks and the teeth thereof being resiliently flexible and having stiffness adequate for transmission of rotation by intermeshing gear action with a mating gear-like member.

8. A tool for smoothing and finishing the sides of grooves in the tooth faces of toothed gear shaving tools, comprising an assemblage of resiliently flexible disks in coaxial relation parallel to one another and spaced apart from one another in the axial direction as to their outer portions, said disks having teeth of gear tooth character at their margins, the sides of which are substantially conjugate to the bottoms of the tooth grooves of such a shaving tool and corresponding teeth of the several disks being alined with one another in an alinement complemental to the spaces between the teeth of such shaving tool.

9. A lapping instrument for smoothing and finishing the sides of the grooves in the tooth faces of toothed gear shaving tools, consisting of a plurality of coaxial disks in rigid association with one another at their central portions, having peripheral teeth substantially conjugate to the bottoms of the tooth grooves of such a shaving tool and of a thickness enough less than the width of said grooves to permit entrance into the grooves, said disks being spaced apart in their outer portions with a spacing between their median planes substantially equal to the spacing between the central planes of said grooves, and having sufficient stiffness to transmit rotation to or from such tool when run in mesh therewith; the disks being sufficiently flexible and resilient to permit of being flexed appreciably out of their respective planes without fracture or acquiring a permanent set.

WALTER F. ROSS.